United States Patent [19]
Kruizenga et al.

[11] Patent Number: 5,544,541
[45] Date of Patent: Aug. 13, 1996

[54] SHIFT SHAFT AND SHIFT BLOCK ASSEMBLY

[75] Inventors: Kenneth J. Kruizenga, Climax; James D. Gluys, Portage, both of Mich.

[73] Assignee: Eaton Corporation, Cleveland, Ohio

[21] Appl. No.: 368,948

[22] Filed: Jan. 5, 1995

[51] Int. Cl.$^6$ ................................................. B60K 20/00
[52] U.S. Cl. ........................................ 74/473 R; 74/477
[58] Field of Search ................................ 74/473 R, 475, 74/477; 403/13, 362, 333, 334, 41, 383, 237; 411/368

[56] References Cited

U.S. PATENT DOCUMENTS

| | | | |
|---|---|---|---|
| 3,279,870 | 10/1966 | Janiszewski | 403/334 |
| 3,863,994 | 2/1975 | Fink | 403/362 |
| 3,867,050 | 2/1975 | Pitner | 403/383 |
| 4,917,530 | 4/1990 | Engelhardt et al. | 403/41 |
| 4,920,815 | 5/1990 | Reynolds | 74/335 |

OTHER PUBLICATIONS

Mark's Standard Handbook for Mechanical Engineers, 8th Ed. ©1978, pp. 6–48.

*Primary Examiner*—Rodney H. Bonck
*Assistant Examiner*—David Fenstermacher
*Attorney, Agent, or Firm*—Howard D. Gordon

[57] ABSTRACT

A single-shaft shifting mechanism (200) for shifting a multiple-speed mechanical transmission (10) is provided. The mechanism includes an axially and rotationally movable shift shaft (204) to which a separate shift block (202) is mounted for axial and rotational movement therewith. The shift block (202) is mounted to the shift shaft (204) with shoulders (210, 212) formed on the shaft and complementary surfaces (236, 238) formed on the block to take axial loading and by pairs of complementary ramps (230, 232, 244, 246) formed on the block and/or shaft clamped together by a shanked fastener (188). The opposed surfaces (222, 248) of the shaft and block through which the shank (188A) of the fastener passes are configured to remain separated.

6 Claims, 4 Drawing Sheets

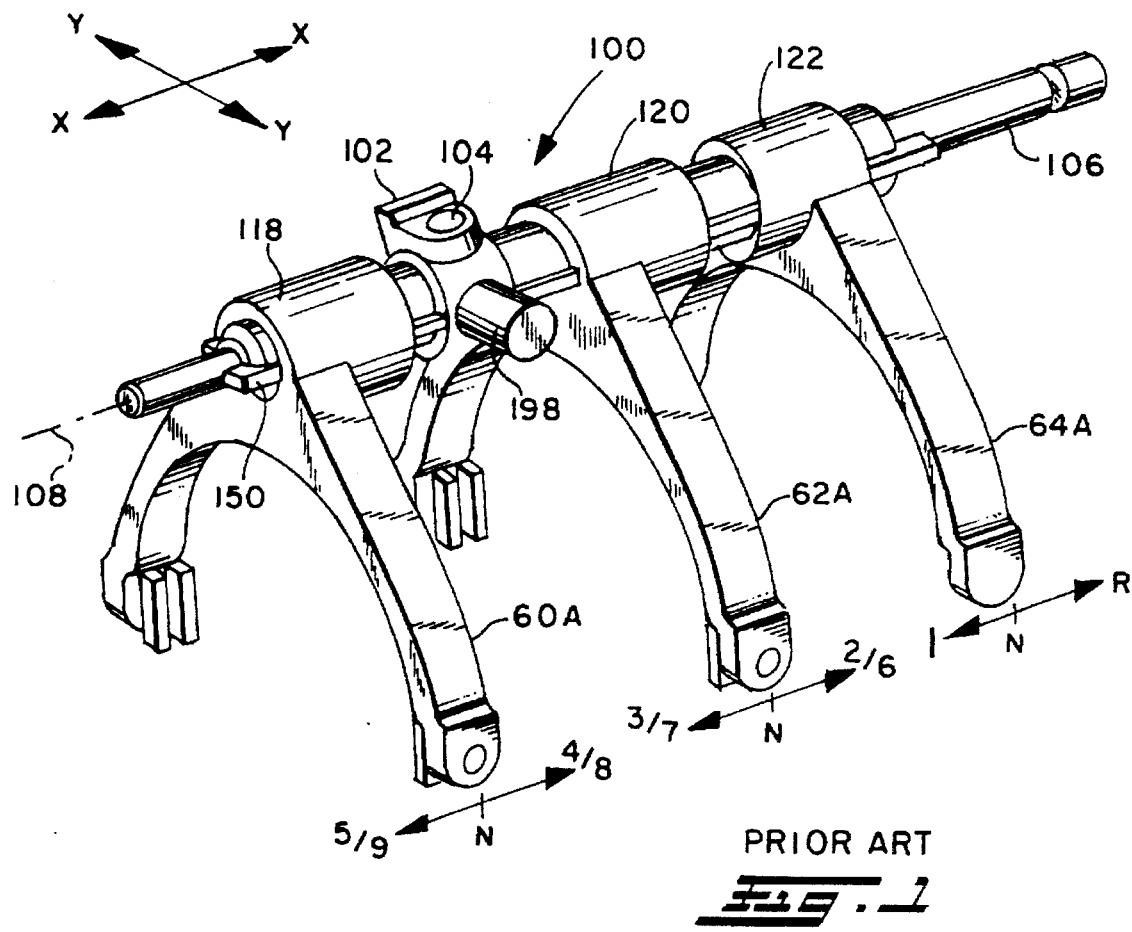
PRIOR ART
FIG. 1
PRIOR ART
FIG. 2

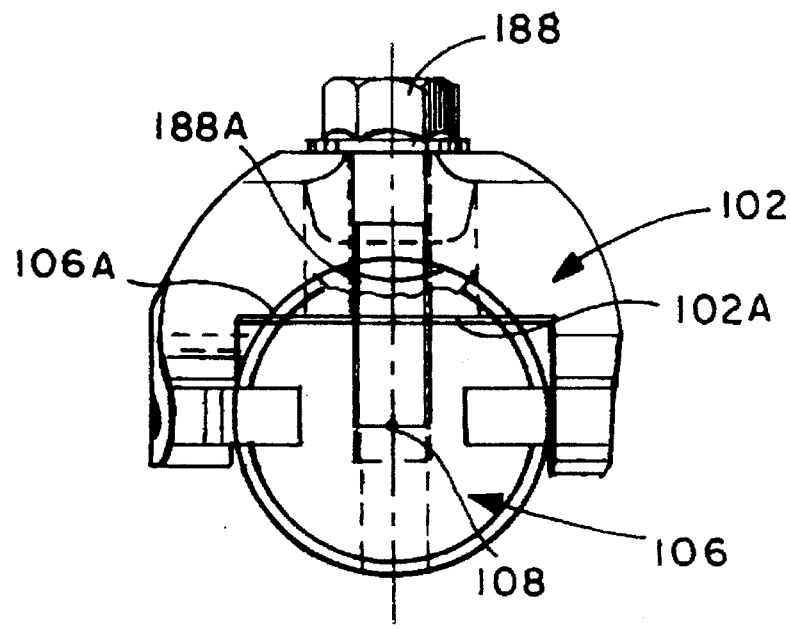
PRIOR ART
FIG. 1A
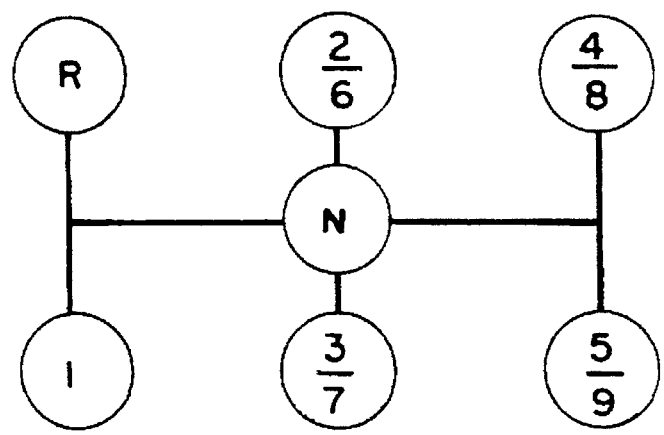
PRIOR ART
FIG. 2A

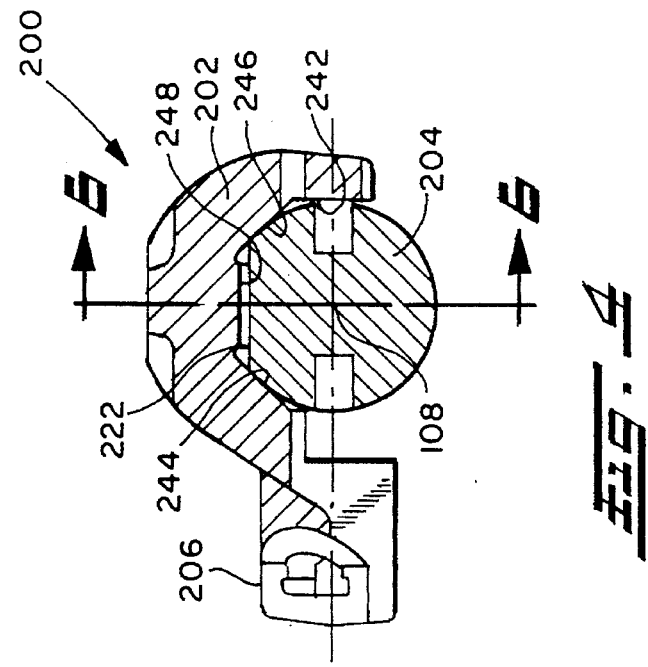
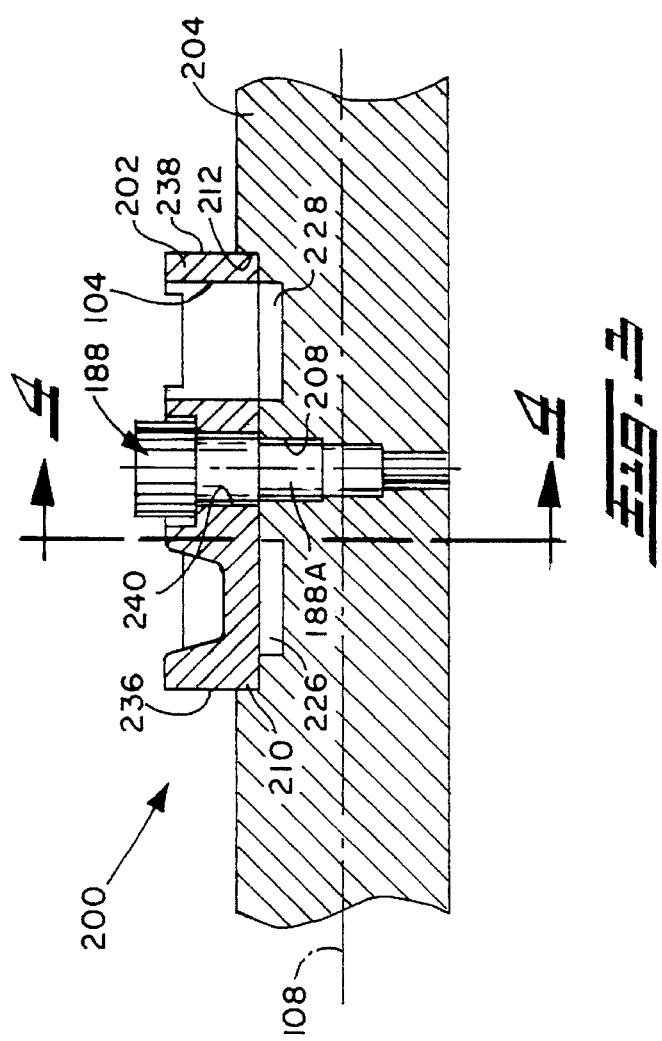

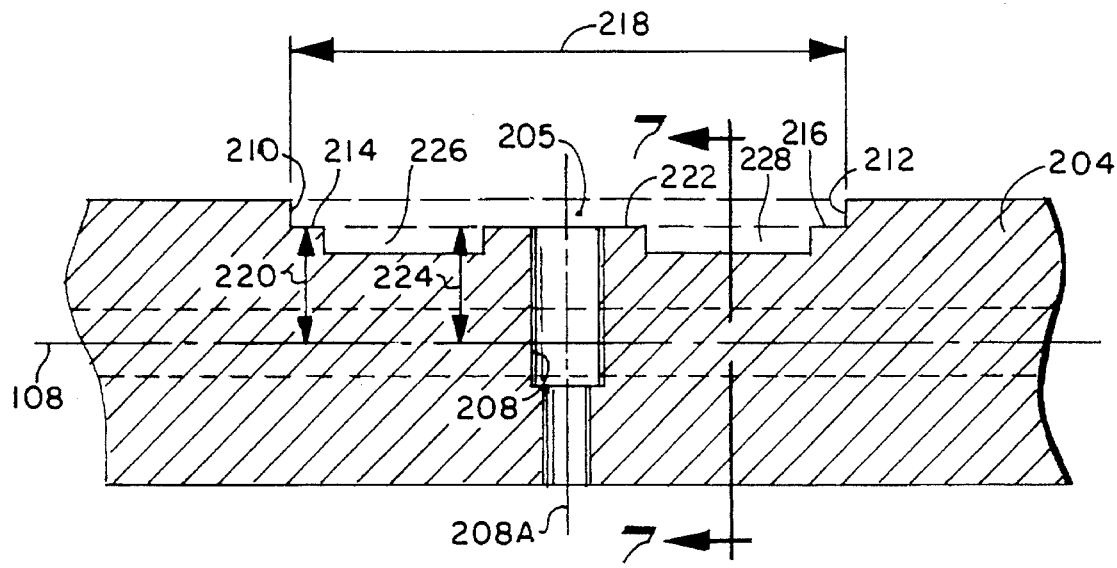
FIG. 5
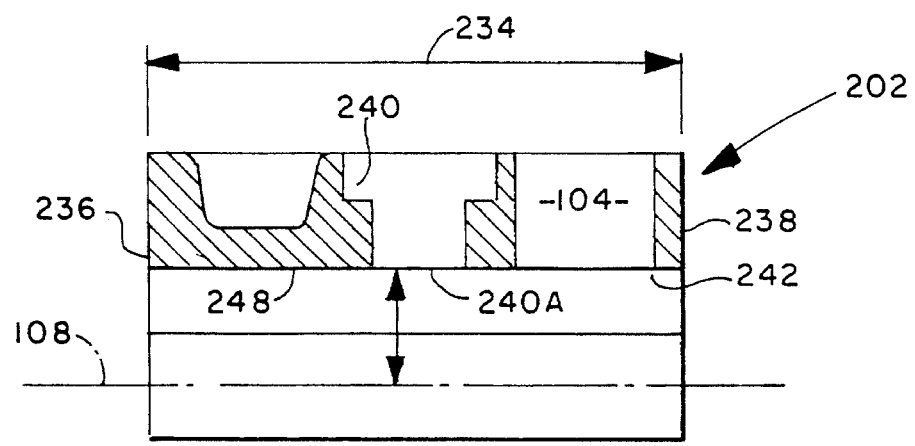
FIG. 6
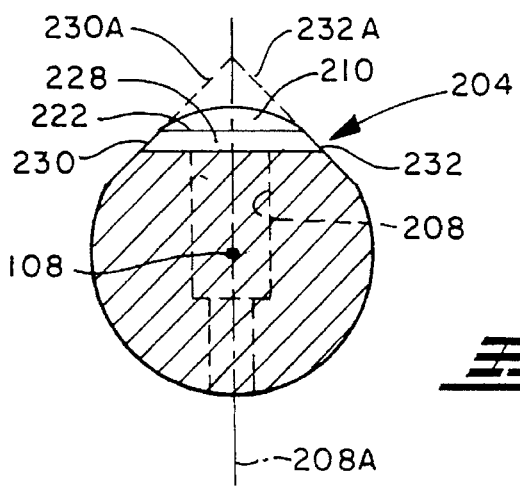
FIG. 7

SHIFT SHAFT AND SHIFT BLOCK ASSEMBLY

BACKGROUND OF THE INVENTION

1. Field of the Invention

The present invention relates to a single-shaft shifting mechanism for change-gear transmissions of the type wherein selected gear ratios are engaged and disengaged by axially movable gears or axially movable jaw clutch members. In particular, the present invention relates to an improved single-shaft shifting mechanism assembly employing an improved shift-block-to-shift-shaft mounting structure.

2. Description of the Prior Art

Single-shaft shifting mechanisms for shifting multiple-speed vehicular transmissions are well known in the prior art, as may be seen by reference to U.S. Pat. Nos. 4,621,537 and 4,920,815, the disclosures of which are incorporated herein by reference. These mechanisms, in certain situations, are improvements over multiple parallel shift rail devices (see U.S. Pat. Nos. 4,445,393 and 4,722,237, the disclosures of which are incorporated herein by reference), as they may require fewer parts, require less space, be more economical to produce and/or allow improved transmission control.

The prior art single-shaft shifting mechanism assemblies were subject to improvement, as, under certain conditions, the shift block might tend to move relative to the shift shaft, which could cause an undesirable "notchy" feeling when shifting the transmission and a loss of critical alignments and/or could eventually lead to failure of the shift-block-to-shift-shaft attachment.

In the prior art single-shaft shifting mechanisms, the shift shaft was provided with a flat surface which mated with a flat surface on the bottom or inner diameter surface of the shift block, and the flat surfaces were secured by a cap screw or like fastener. As a result of inherent tolerances in manufacturing, when the block-to-shaft joint loosened due to loading during shifting, the block did not fit tightly on the shaft, which resulted in a loss of accurate alignments and caused a notchy feeling when shifting. Further, the loosening also allowed the forces imparted to the shift block to be translated primarily into side loading of the retaining fastener, which, if allowed to continue, may eventually lead to failure of the fastener under fatigue cycling.

SUMMARY OF THE INVENTION

In accordance with the present invention, the drawbacks of the prior art are minimized by the provision of an improved single-shaft shifting mechanism assembly. The improved assembly utilizes an improved shift-block-to-shift-shaft mounting structure which will minimize or eliminate loosening of the shift-block-to-shift-shaft joint and, thus, minimize or eliminate the occurrence of notchy shift feeling and the possibility of shift-block-to-shift-shaft joint failure.

The foregoing is accomplished by utilizing a "trapezoidal-type" design wherein the radially inner surfaces of the block and the outer surface of the shaft are provided with complementary ramp surfaces and the fastener passes through opposed spaced-apart surfaces on the block and shah which are interposed between the ramps. The tensile force exerted by the cap screw or like fastener, thus, provides a constant clamping of the block to the shaft at the ramps. Further, side forces on the block are at least partially translated along the incline of the ramp surfaces into tensile forces in the cap screw. As is known, cap screws, bolts, rivets and the like are better designed to handle tensile than side (i.e., shear) loading and, thus, the possibility of joint failure is minimized.

Accordingly, it is an object of the present invention to provide a new and improved single-shaft shifting mechanism. This and other objects and advantages of the present invention will become apparent from a reading of the detailed description of the preferred embodiment in connection with the drawings.

BRIEF DESCRIPTION OF THE DRAWINGS

FIG. 1 is a perspective view of a prior art single-shaft shifting mechanism.

FIG. 1A is an enlarged partial section view of the prior art single-shaft shifting mechanism of FIG. 1 illustrating the prior art shift-block-to-shift-shaft joint structure.

FIG. 2 is a schematic illustration of a typical prior art vehicular transmission advantageously utilizing single-shaft shifting mechanisms.

FIG. 2A is a schematic illustration of the shift pattern for the transmission of FIG. 2.

FIG. 3 is a partial sectional side view of the shift-block-to-shift-shaft mounting structure of the present invention.

FIG. 4 is a sectional view taken along line 4—4 of FIG. 3.

FIG. 5 is a sectional side view of the shift shaft of the present invention.

FIG. 6 is a sectional view of the shift block of the present invention taken along line 6—6 of FIG. 4.

FIG. 7 is a sectional view taken along line 7—7 of FIG. 5.

DESCRIPTION OF THE PREFERRED EMBODIMENT

Certain terminology in the following description will be used only for convenience and will not be limiting. The words "upwardly," "downwardly," "rightwardly" and "leftwardly" will designate directions in the drawings to which reference is made. The words "forward" and "rearward," respectively, will refer to the front and rear ends of the transmission as conventionally mounted in a vehicle, being from left and right sides, respectively, of the transmission illustrated in FIG. 2. The words "inwardly" and "outwardly" will refer to directions toward and away from, respectively, the geometric center of the device and designated parts thereof. Said terminology will include the words specifically mentioned above, derivatives thereof and words of similar import.

The term "compound transmission" is used to designate a change-speed or change-gear transmission having a multiple-forward-speed main transmission section and a multiple-speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate and substantially synchronous speed.

As used herein, the term "transmission" shall refer to either a simple transmission or to the main transmission section of a compound transmission.

Referring to FIG. 2, a range-type compound transmission 10 with which the shifting mechanism of the present invention is advantageously utilized is illustrated. Compound transmission 10 comprises a multiple-speed main transmission section 12 connected in series with a range-type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28, which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with a shift actuator, as is well known in the prior art. Clutch collars 60, 62 and 64 may be of the well-known acting synchronized or non-synchronized double-acting jaw clutch type.

Mainshaft gear 58 is the reverse gear and is in continuous meshing engagement with countershaft gears 48 by means of conventional intermediate idler gears (not shown). It also should be noted that while main transmission section 12 does provide five selectable forward speed ratios, the lowest forward speed ratio, namely that provided by drivingly connecting mainshaft drive gear 56 to mainshaft 28, often is of such a high gear reduction that it must be considered a low or "creeper" gear, which is utilized only for starting of a vehicle under severe conditions and is not usually utilized in the high transmission range. Accordingly, while main transmission section 12 does provide five forward speeds, it is usually referred to as a "4+1" main section, as only four of the forward speeds are compounded by the auxiliary range transmission section 14 utilized therewith.

Jaw clutches 60, 62, and 64 are 3-position clutches in that they may be positioned in the centered, non-engaged position as illustrated, or in a fully rightwardly engaged or fully leftwardly engaged position by means of a shift finger associated with a shift lever or shift cross-shaft or other "X–Y" shifting mechanism. As is well known, only one of the clutches 60, 62 and 64 is engageable at a given time and main section interlock means are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86, while auxiliary section countershaft gears 84 are constantly meshed with output gear 88, which is fixed to transmission output shaft 90.

A 2-position synchronized jaw clutch assembly 92, which is axially positioned by means of a shift fork and range section shifting actuator assembly, is provided for clutching either gear 86 to mainshaft 28 for low-range operation or gear 88 to mainshaft 28 for direct or high-range operation of the compound transmission 10. The shift pattern for compound range-type transmission 10 is schematically illustrated in FIG. 2A. Selection of low- or high-range operation of transmission 10 is by means of an operator-actuated switch or button, which is usually located at the shift lever. Alternatively, a "double-H" type auxiliary shifting device may be utilized.

A prior art single-shaft shifting mechanism 100 may be seen by reference to FIGS. 1 and 1A. The shifting mechanism 100 includes a block member 102 defining a simple socket 104 for forming a ball-and-socket-type connection with either a direct or remote shifting actuator (not shown). Direct shift actuators, such as shift lever/tower mechanisms utilized with conventional trucks and tractors, and remote shifting actuators of the type utilized with cab-over-engine trucks and tractors, are both well known, as may be seen by reference to U.S. Pat. Nos. 3,799,002; 3,934,485; 4,290,515; 4,275,612 and 4,543,843, the disclosures of which are hereby incorporated by reference.

The shifting mechanism 100 is designed for use on a vehicular transmission, such as transmission 10, comprising a number of selectively engageable gear ratios, each designed to be engaged by axial movement of a clutch member into engagement with a corresponding jaw clutch member by means of shift forks, such as shift forks 60A, 62A, and 64A. The shift forks are effective to axially position a selective one of the clutch collars in opposite axial directions from the centered nonengaged positions thereof, as illustrated in FIG. 2.

The shifting mechanism 100 includes a shaft 106 mounted in housing H for rotation about and axial movement along its axis 108. Shaft 106 supports the three shift forks 60A, 62A and 64A. Each of the shift forks includes a hub-like portion 118, 120, and 122, which are provided with through bores through which the shaft 106 is received.

Axial displacement and rotation of shaft 106 relative to housing H are controlled by a remote or direct shifting actuator (not shown) acting on the socket connector of block member 102, which is axially and rotationally fixed to the shaft 106 as by cap screw 188. It is noted that an interlock key 150 or the like may carry a plurality of outwardly extending, semi-annular recesses for interaction with a spring-biased detent ball carried by a detent mechanism 198 of the block member 102 for providing an indication of axial movement of the shaft 106 relative to the housing from the neutral center position thereof to an axially displaced in-gear position thereof.

Briefly, rotation of shaft 106 about its axis 108, accomplished by moving the shift finger received in the socket 104 in the "Y—Y" direction, will select a shift fork to move axially with shaft 106 and will fix the non-selected shift forks relative to the housing. Movement of the shaft along its axis, accomplished by moving the shift finger received in the socket 104 in the "X—X" direction, will cause selected clutches 60, 62, 64 to be engaged or disengaged. Details of operation of shift mechanism 100 may be appreciated in greater detail by reference to U.S. Pat. Nos. 4,920,815 and 4,621,537, the disclosures of which are incorporated herein by reference.

Referring to FIG. 1A, the prior art mounting of the shift block 102 to the shift shaft 106 may be seen in detail. Shaft 106 and block 102 are provided with complementary flat surfaces 106A and 102A, respectively, which are clamped together by cap screw 188.

As a result of manufacturing tolerances, when this joint tended to loosen due to loading during shifting, the block 102 did not fit tightly on the shaft 106, which could result in a loss of accurate alignment and cause a "notchy" feeling when shifting. Further, the loosening of the joint also allowed the forces imparted to the shift block to be translated into side loading of shank 188A of cap screw 188 which, if allowed to continue, may eventually lead to failure of cap screw 188 under fatigue loading.

Portions of the improved single-shaft shifting mechanism 200 of the present invention are illustrated in FIGS. 3–7. Except for the attachment of shift block 202 to shift shaft 204, the shift mechanism 200 of the present invention is preferably substantially structurally and functionally identical to shift mechanism 100, described above. Accordingly, only the shift block/shift shaft joint of mechanism 200 will be described in detail.

FIGS. 3 and 4 are sectional views of shift mechanism 200 at the shift block/shift shaft joint. As with mechanism 100, the shift block 202 defines a socket 104 for receiving the shift finger of a shift actuator and is mounted to shift shaft 204 for axial and rotational movement therewith by a single cap screw 188. Shift block 202 may carry a projection 206 for housing a spring-biased detent mechanism similar to mechanism 198 utilized with shift block 102.

As seen in FIGS. 5 and 7, shaft 204 is provided with a radially extending internally threaded bore 208 for threadably receiving the externally threaded shank 188A of cap screw 188. Of course, other types of fasteners, such as bolts and nuts, studs and/or rivets, may be substituted for cap screw 188.

Shaft 204 has a first generally chordal area of removal of material 205 generally centered on the axis 208A of bore 208 to define shoulders 210 and 212 and chordal surfaces 214 and 216. Shoulders 210 and 212 are separated by an axial distance 218, while surfaces 214 and 216 are generally perpendicular to axis 208A and are at a radial distance 220 from axis 108. A generally chordal surface 222 surrounds the bore 208 and is radially spaced from axis 108 by a distance 224, which is no greater than and is preferably less than distance 220. Surfaces 212 and 214 are separated from surface 222 by relief areas 226 and 228.

As best seen in FIG. 7, shaft 204 defines a pair of flat generally chordally extending ramps 230, 232 on the outer periphery thereof. Ramps 230, 232 are preferably equally radially spaced about axis 208A and define planes, represented by dotted lines 230A, 232A, which, if extended, would intersect in cross-section on axis 208A.

FIG. 6 is a sectional view of shift block 202. Shift block 202 is of an axial length 234 slightly less than axial length 218 to define flat surfaces 236 and 238, which will closely fit, preferably an almost press fit, shoulders 210 and 212 on shaft 204. Accordingly, axial forces between the shift block 202 and shift shaft 204 will be transferred between the shoulders 210 and 212 and surfaces 236 and 238 and will not be transmitted as side forces to shaft or shank 188A of cap screw 188 and alignment in the axial direction will be maintained.

The shift block 202 is provided with a countersunk through bore 240 for receipt of cap screw 188 in alignment with bore 208 in shaft 204. Shift block 202 (see FIGS. 4 and 6) defines an inner diameter surface 242 for surrounding shaft 204 in the assembled positions thereof. Surface 242 defines a pair of ramped surfaces 244 and 246 which are equally radially spaced about inner diameter surface opening 240A to bore 240 and are complementary with ramps 230 and 232, respectively, on shaft 204. The portion 248 of inner diameter surface 242 surrounding the opening 240A to bore 240 is designed so that when the ramps 230 and 232 on shaft 204 are clamped into contact with the ramps 244 and 246 on block 202, the surface 222 on shaft 204 will be separated from and will not contact inner diameter surface 242 on the block 202.

As a possible alternate design, the ramps 230 and 232 on the shift shaft may be eliminated, and the ramps 244 and 246 on the inner diameter surface 242 of the shift block will contact the annular outer diameter surface of the shift shaft.

Accordingly, the opposed surfaces 222 and 224 on the shaft and block, respectively, through which the shank 188A of the cap screw 188 passes are maintained out of contact and are interposed between the contacting complementary ramp surfaces on the block and shaft. The tensile force in the cap screw, thus, maintains a constant clamping of the block to the shaft at the ramped surfaces. Further, side forces in the "Y—Y" direction between the block and shaft are at least partially translated along the incline of the ramps into tensile forces in the cap screw. As is well known, fasteners such as cap screws, bolts, studs, rivets and the like are better designed to handle tensile than side (i.e., shear) forces and, thus, the possibility of a shift block/shift shaft joint failure is minimized.

Although the present invention has been set forth with a certain degree of particularity, it is understood that various modifications are possible without departing from the spirit and the scope of the invention as hereinafter claimed.

We claim:

1. A single-shaft shifting mechanism (200) for selection and for engagement and disengagement of selectable gear ratios in a multiple-speed transmission (10), said mechanism comprising a shift shaft (204) having a first axis (108) and being mounted for axial and rotational movement in a housing (H), a shift block member (202) separate from said shift shaft and fixed for axial and rotational movement with said shift shaft, said shift block member defining a fitting (104) for receiving a shift actuator movable in a first direction (X—X) generally parallel to the axis (108) of said shaft and in a second direction (Y—Y) generally perpendicular to the axis of said shaft, and a plurality of shift forks (60A, 62A, 64A), each having a hub portion (118, 120, 122) defining a through bore for receipt of said shift shaft, said shifting mechanism characterized by:

said shift shaft defining (i) a bore (208) having a second axis (208A) for receipt of a shank (188A) of a fastener; (ii) an outer surface (222) surrounding an opening to said bore; (iii) a pair of radially extending axially inwardly facing shoulders (210, 212) separated by a first axial distance (218), and (iv) a first pair of generally chordally extending ramps (230, 232) inclined toward said outer surface and equally radially spaced about said second axis and defining planes which, if extended, will intersect at said second axis;

said shift block defining (i) a through bore (240) for receipt of a shank of a fastener; (ii) a pair of radially extending axially outwardly facing surfaces (236, 238) separated by a second axial distance (234) generally equal to said first axial distance; and (iii) an inner diameter surface (242) surrounding said shift shaft and defining a second pair of ramps (244, 246) equally spaced from an opening to said through bore and complementary to and engageable with said first pair of ramps, said inner diameter surface surrounding the opening to said through bore further defining an opposed surface (248) opposite from and spaced from said outer surface when said first and second pairs of ramps are in contact; and a shanked fastener (188) having a shank received in said bores for clamping said first and second pairs of ramps into contact.

2. The mechanism of claim 1 wherein said bores are coaxial about a second axis (108A) generally perpendicular to and intersecting said first axis.

3. A single-shaft shifting mechanism (200) for selection and for engagement and disengagement of selectable gear ratios in a multiple-speed transmission (10), said mechanism comprising a shift shaft (204) having a first axis (108) and being mounted for axial and rotational movement in a housing (H), a shift block member (202) separate from said shift shaft and fixed for axial and rotational movement with said shift shaft, said shift block member defining a fitting (104) for receiving a shift actuator movable in a first direction (X—X) generally parallel to the axis (108) of said shaft and in a second direction (Y—Y) generally perpendicular to the axis of said shaft, and a plurality of shift forks (60A, 62A, 64A), each having a hub portion (118, 120, 122) defining a through bore for receipt of said shift shaft, said shifting mechanism characterized by:

said shift shaft defining (i) a bore (208) having a second axis (208A) for receipt of a shank (188A) of a fastener; (ii) an outer surface (222) surrounding an opening to said bore; and (iii) a pair of radially extending axially inwardly facing shoulders (210, 212) separated by a first axial distance (218);

said shift block defining (i) a through bore (240) for receipt of a shank of a fastener; (ii) a pair of radially extending axially outwardly facing surfaces (236, 238) separated by a second axial distance (234) generally equal to said first axial distance; and (iii) an inner diameter surface (242) surrounding said shift shaft and defining a second pair of generally chordally extending ramps (244, 246) inclined inwardly toward and equally spaced from the opening to said through bore, said inner diameter surface surrounding the opening to said through bore further defining an opposed surface (248) opposite from and spaced from said outer surface when said ramps are in contact with said shift shaft; and a shanked fastener (188) having a shank received in said bores for clamping said pair of ramps into contact with said shaft.

4. The mechanism of claim 3 wherein said bores are coaxial about a second axis (108A) generally perpendicular to and intersecting said first axis.

5. A single-shaft shifting mechanism (200) for selection and for engagement and disengagement of selectable gear ratios in a multiple-speed transmission (10), said mechanism comprising a shift shaft (204) having an axis (108) and being mounted for axial and rotational movement in a housing (H), a shift block member (202) separate from said shift shaft and fixed for axial and rotational movement with said shift shaft, said shift block member defining a fitting (104) for receiving a shift actuator movable in a first direction (X—X) generally parallel to the axis (108) of said shaft and in a second direction (Y—Y) generally perpendicular to the axis of said shaft, and a plurality of shift forks (60A, 62A, 64A), each having a hub portion (118, 120, 122, respectively) defining a through bore for receipt of said shift shaft, said shifting mechanism characterized by:

said shift shaft defining (i) a bore (208) having a second axis (208A) for receipt of a shank (188A) of a fastener; (ii) an outer surface (222) surrounding an opening to said bore; and (iii) a pair of radially extending axially inwardly facing shoulders (210, 212) separated by a first axial distance (218);

said shift block defining (i) a through bore (240) for receipt of a shank of a fastener; (ii) a pair of radially extending axially outwardly facing surfaces (236, 238) separated by a second axial distance (234) generally equal to said first axial distance; and (iii) an inner diameter surface (242) surrounding said shift shaft and defining an opposed surface (248) opposite from and spaced from said outer surface when said shift block is assembled to said shift shaft;

one of said shift shaft and shift block defining a pair of generally chordally extending ramps (230, 232) inclined toward said outer surface and equally radially spaced about said second axis and defining planes which, if extended, will intersect at said second axis; said ramps contacting the inner surface of the other of said shift shaft and shift block; and a shanked fastener (188) having a shank passing through said bores for clamping said pair of ramps into contact with the inner surface of the other of said shift shaft and shift block.

6. The mechanism of claim 5 wherein said bores are coaxial about a second axis (108A) generally perpendicular to and intersecting said first axis.

\* \* \* \* \*